US012638987B2

(12) United States Patent
Bae et al.

(10) Patent No.: US 12,638,987 B2
(45) Date of Patent: May 26, 2026

(54) STORAGE SYSTEM STORING USER IDENTIFICATION INFORMATION AND CLOUD SYSTEM INCLUDING THE SAME

(71) Applicant: Samsung Electronics Co., Ltd., Suwon-si (KR)

(72) Inventors: Mungyu Bae, Suwon-si (KR); Sungho Yoon, Suwon-si (KR); Jisoo Kim, Suwon-si (KR); Younsung Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/800,350

(22) Filed: Aug. 12, 2024

(65) Prior Publication Data

US 2025/0085874 A1     Mar. 13, 2025

(30) Foreign Application Priority Data

Sep. 11, 2023     (KR) ........................ 10-2023-0120492

(51) Int. Cl.
*G06F 3/06*              (2006.01)
(52) U.S. Cl.
CPC .......... *G06F 3/0631* (2013.01); *G06F 3/0604* (2013.01); *G06F 3/067* (2013.01)
(58) Field of Classification Search
CPC ....... G06F 3/0631; G06F 3/0604; G06F 3/067
See application file for complete search history.

(56) References Cited

U.S. PATENT DOCUMENTS

| | | | |
|---|---|---|---|
| 8,856,553 B2 | 10/2014 | Lyakhovitskiy et al. | |
| 9,076,018 B2 | 7/2015 | Johnson | |
| 9,225,707 B1 * | 12/2015 | de Sousa ................ | H04L 63/08 |
| 9,304,941 B2 | 4/2016 | Kamath et al. | |
| 9,871,787 B2 | 1/2018 | Gale | |
| 11,204,986 B1 | 12/2021 | Rao et al. | |
| 2012/0278861 A1 * | 11/2012 | Lu ........................... | G06F 21/45 |
| | | | 726/4 |
| 2013/0024681 A1 * | 1/2013 | Gattegno .................. | G06F 8/63 |
| | | | 713/2 |
| 2013/0254536 A1 * | 9/2013 | Glover ................ | G06F 21/6209 |
| | | | 713/165 |
| 2014/0173705 A1 * | 6/2014 | Manning ................. | H04L 63/08 |
| | | | 726/6 |
| 2015/0242657 A1 | 8/2015 | Kim | |
| 2018/0227288 A1 * | 8/2018 | Zhu ......................... | H04L 9/006 |
| 2019/0266103 A1 * | 8/2019 | Pearson ................ | H04L 9/0897 |
| 2021/0385301 A1 * | 12/2021 | Supramaniam ..... | H04L 67/1095 |

(Continued)

FOREIGN PATENT DOCUMENTS

CN              115509455 A      12/2022

*Primary Examiner* — Ryan Bertram
(74) *Attorney, Agent, or Firm* — Fish & Richardson P.C.

(57) ABSTRACT

Provided is a storage system. When a user registration request for a new user is received, the storage system is configured to allocate a user storage space for the new user in a plurality of storage devices, and, when a user activation request for the new user is received, the storage system is configured to generate user identification information regarding the new user, based on user credential information of the new user included in the user activation request, allocate a user area for the new user in the memory, and store the user identification information regarding the new user in the user area for the new user.

20 Claims, 10 Drawing Sheets

START

RECEIVE USER REGISTRATION REQUEST FROM COMPUTING DEVICE --- S610

ALLOCATE USER STORAGE SPACE IN PLURALITY OF STORAGE DEVICES --- S620

RECEIVE USER ACTIVATION REQUEST FROM COMPUTING DEVICE --- S630

GENERATE USER IDENTIFICATION INFORMATION BASED ON USER CREDENTIAL INFORMATION --- S640

ALLOCATE USER AREA IN MEMORY --- S650

SET USER AREA IN MEMORY TO WRITEABLE STATE --- S660

STORE USER IDENTIFICATION INFORMATION IN USER AREA IN MEMORY --- S670

SET USER AREA IN MEMORY TO READ-ONLY STATE --- S680

PERFORM INITIAL SETUP OF ENCRYPTION FUNCTION FOR USER STORAGE SPACE --- S690

SET USER AREA FOR NEW USER IN MEMORY TO LOCKED STATE --- S700

END

(56)            References Cited

U.S. PATENT DOCUMENTS

2022/0158829 A1*   5/2022   Parkhill ................ H04L 9/0863
2024/0118816 A1     4/2024   Huang et al.
2024/0256649 A1*   8/2024   Chen ..................... G06F 21/602
2024/0311489 A1*   9/2024   Jin ........................ H04L 9/3247

* cited by examiner

FIG. 4

| USER AREA | STATE |
|-----------|-------|
| 1 | LK |
| 2 | LK |
| 3 | LK |
| 4 | RW |

STORE USER IDENTIFICATION INFORMATION →

| USER AREA | STATE |
|-----------|-------|
| 1 | LK |
| 2 | LK |
| 3 | LK |
| 4 | RO |

INITIAL SETUP OF ENCRYPTION FUNCTION →

| USER AREA | STATE |
|-----------|-------|
| 1 | LK |
| 2 | LK |
| 3 | LK |
| 4 | LK |

FIG. 5

| USER AREA | STATE |
|-----------|-------|
| 1 | LK |
| 2 | LK |
| 3 | LK |
| 4 | LK |

RECEIVE FUNCTION SETUP REQUEST

| USER AREA | STATE |
|-----------|-------|
| 1 | RO |
| 2 | LK |
| 3 | LK |
| 4 | LK |

SET UP ENCRYPTION FUNCTION

| USER AREA | STATE |
|-----------|-------|
| 1 | LK |
| 2 | LK |
| 3 | LK |
| 4 | LK |

FIG. 6

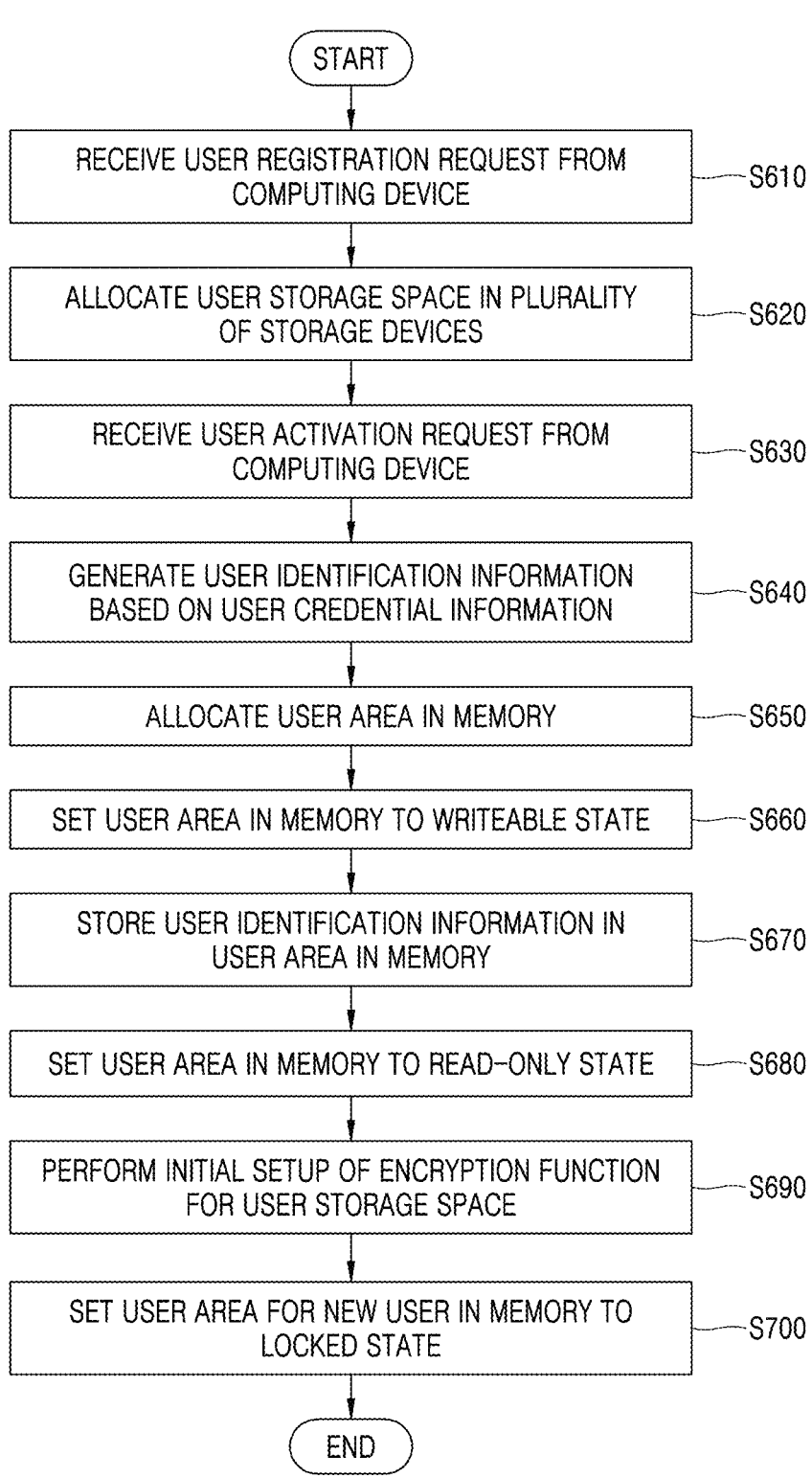

START

RECEIVE USER REGISTRATION REQUEST FROM COMPUTING DEVICE ——S610

ALLOCATE USER STORAGE SPACE IN PLURALITY OF STORAGE DEVICES ——S620

RECEIVE USER ACTIVATION REQUEST FROM COMPUTING DEVICE ——S630

GENERATE USER IDENTIFICATION INFORMATION BASED ON USER CREDENTIAL INFORMATION ——S640

ALLOCATE USER AREA IN MEMORY ——S650

SET USER AREA IN MEMORY TO WRITEABLE STATE ——S660

STORE USER IDENTIFICATION INFORMATION IN USER AREA IN MEMORY ——S670

SET USER AREA IN MEMORY TO READ-ONLY STATE ——S680

PERFORM INITIAL SETUP OF ENCRYPTION FUNCTION FOR USER STORAGE SPACE ——S690

SET USER AREA FOR NEW USER IN MEMORY TO LOCKED STATE ——S700

END

START

RECEIVE FUNCTION SETUP REQUEST FROM
COMPUTING DEVICE                                    —S710

SET USER AREA IN MEMORY TO READ-ONLY STATE          —S720

READ USER IDENTIFICATION INFORMATION FROM
USER AREA                                          —S730

PERFORM SETUP OF ENCRYPTION FUNCTION
BASED ON USER IDENTIFICATION INFORMATION           —S740

SET USER AREA IN MEMORY TO LOCKED STATE             —S750

END

FIG. 10

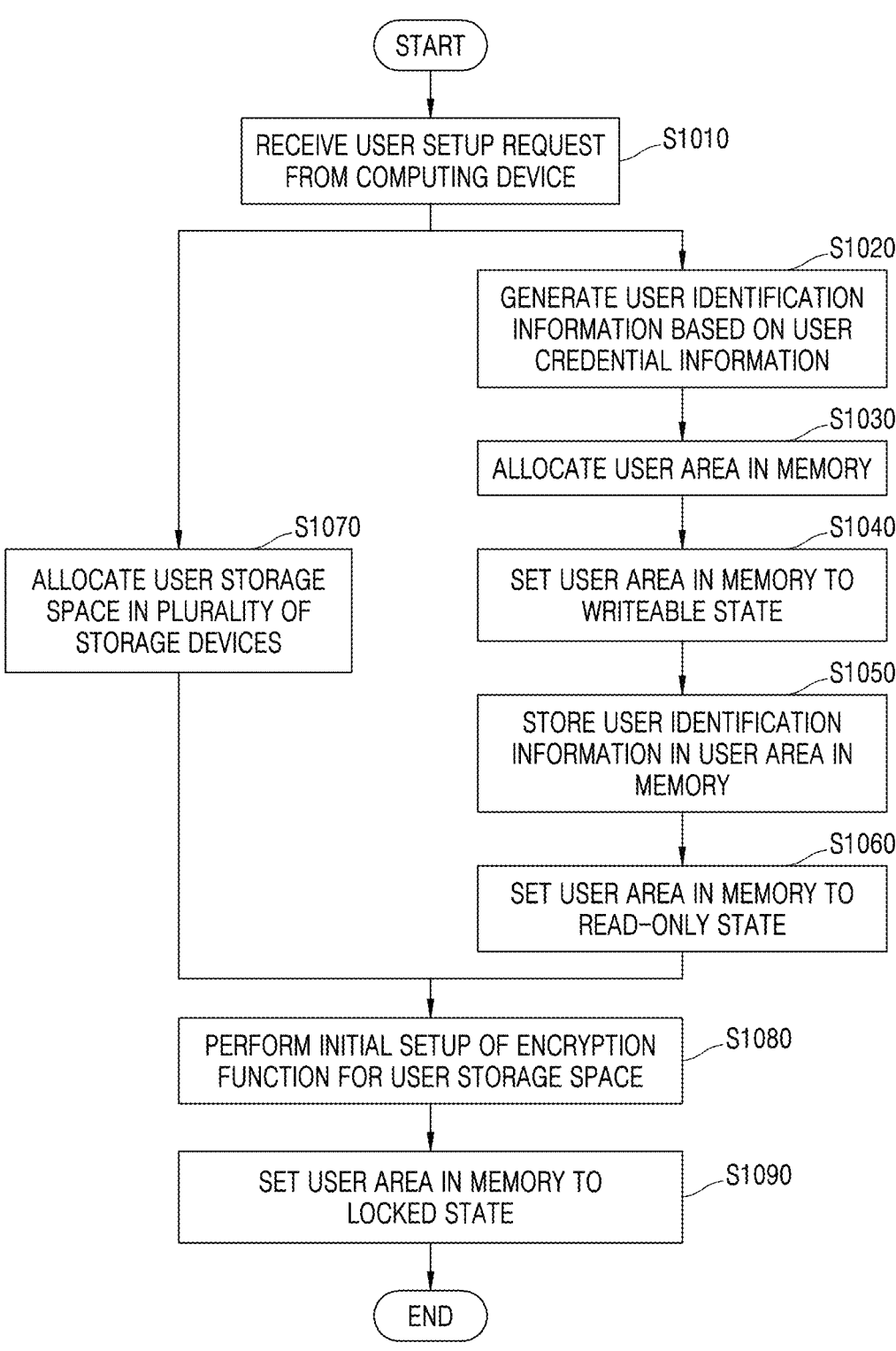

START

RECEIVE USER SETUP REQUEST FROM COMPUTING DEVICE ⸺S1010

GENERATE USER IDENTIFICATION INFORMATION BASED ON USER CREDENTIAL INFORMATION ⸺S1020

ALLOCATE USER AREA IN MEMORY ⸺S1030

ALLOCATE USER STORAGE SPACE IN PLURALITY OF STORAGE DEVICES ⸺S1070

SET USER AREA IN MEMORY TO WRITEABLE STATE ⸺S1040

STORE USER IDENTIFICATION INFORMATION IN USER AREA IN MEMORY ⸺S1050

SET USER AREA IN MEMORY TO READ-ONLY STATE ⸺S1060

PERFORM INITIAL SETUP OF ENCRYPTION FUNCTION FOR USER STORAGE SPACE ⸺S1080

SET USER AREA IN MEMORY TO LOCKED STATE ⸺S1090

END

1

STORAGE SYSTEM STORING USER IDENTIFICATION INFORMATION AND CLOUD SYSTEM INCLUDING THE SAME

CROSS-REFERENCE TO RELATED APPLICATION

This application is based on and claims priority under 35 U.S.C. § 119 to Korean Patent Application No. 10-2023-0120492, filed on Sep. 11, 2023, in the Korean Intellectual Property Office, the disclosure of which is incorporated by reference herein in its entirety.

BACKGROUND

The present inventive concepts relate to storage systems that store user identification information.

As non-volatile memory, flash memory may maintain stored data even when power is turned off, and storage devices including flash memory such as a Solid State Drive (SSD) and a memory card are widely used.

Recently, as the demand for data security increases, security functions are being developed to safely store important data requiring security and prevent or mitigate data leakage even when a storage device is disposed of or stolen. From among security functions of storage devices, a self-encrypting drive (SED) function may provide strong data protection by encrypting and writing data and decrypting and reading encrypted data.

A storage device to which an SED function is applied may be included in a large-capacity storage system accessed by a plurality of users. To use an SED function, a virtual machine included in a computing device accessing a storage system needs to directly manage a password used for the SED function and transmit the password directly to a storage device included in the storage system. However, security problems may occur due to the direct transmission of a password. Therefore, it is advantageous to develop a technique to resolve the security problems.

SUMMARY

The present inventive concepts provide storage systems with improved security.

According to some example embodiments, there is provided a storage system including a controller configured to control an overall operation of the storage system, a memory including a plurality of user areas respectively allocated to a plurality of users and configured to store user identification information regarding the plurality of users in the plurality of user areas, respectively, and a plurality of storage devices including a plurality of user storage spaces allocated for the plurality of users, wherein, when a user registration request for a new user is received, the controller is configured to allocate a user storage space for the new user in the plurality of storage devices, and when a user activation request for the new user is received, the controller is configured to generate user identification information regarding the new user based on user credential information of the new user included in the user activation request, allocate a user area for the new user in the memory, and store the user identification information regarding the new user in the user area for the new user.

According to some example embodiments, there is provided a storage system including a controller configured to control an overall operation of the storage system, a memory including a plurality of user areas respectively allocated to a plurality of users and configured to store user identification information regarding the plurality of users in the plurality of user areas, respectively, and a plurality of storage devices including a plurality of user storage spaces allocated for the plurality of users, wherein, when a function setup request including user credential information of a first user from among the plurality of users is received, the controller is configured to switch a user area for the first user in the memory from the locked state to the read-only state, read user identification information regarding the first user from the user area for the first user in the memory, and perform setup of the encryption function for the user storage space for the first user in the plurality of storage devices based on the user identification information regarding the first user.

According to some example embodiments, there is provided a cloud system including a computing device configured to perform calculations for a plurality of users through a plurality of virtual machines, respectively, and a storage system configured to store data of the plurality of users, wherein the storage system includes a controller configured to control an overall operation of the storage system, a memory including a plurality of user areas respectively allocated to the plurality of users and configured to store user identification information regarding the plurality of users in the plurality of user areas, respectively, and a plurality of storage devices including a plurality of user storage spaces allocated for the plurality of users, the computing device configured to transmit a user setup request for a new user to the controller, and, in response to the user setup request, the controller is configured to allocate a user area for the new user in the memory, generate user identification information regarding the new user based on user credential information of the new user included in the user setup request, store the user identification information regarding the new user in the user area for the new user, and allocate a user storage space of the new user in the plurality of storage devices.

BRIEF DESCRIPTION OF THE DRAWINGS

Example embodiments of the present inventive concepts will be more clearly understood from the following detailed description taken in conjunction with the accompanying drawings in which:

FIG. 4 is a diagram showing a change in the state of a user area according to the operation of a storage system after a user activation request is received, according to some example embodiments;

FIG. 5 is a diagram showing a change in the state of a user area when a storage system receives a function setup request, according to some example embodiments;

FIG. 6 is a flowchart showing an operating method of a storage system when a new user subscribes to the storage system, according to some example embodiments;

FIG. 10 is a flowchart of another example of an operating method of a storage system when a new user subscribes to the storage system, according to some example embodiments.

DETAILED DESCRIPTION

Figure 1:
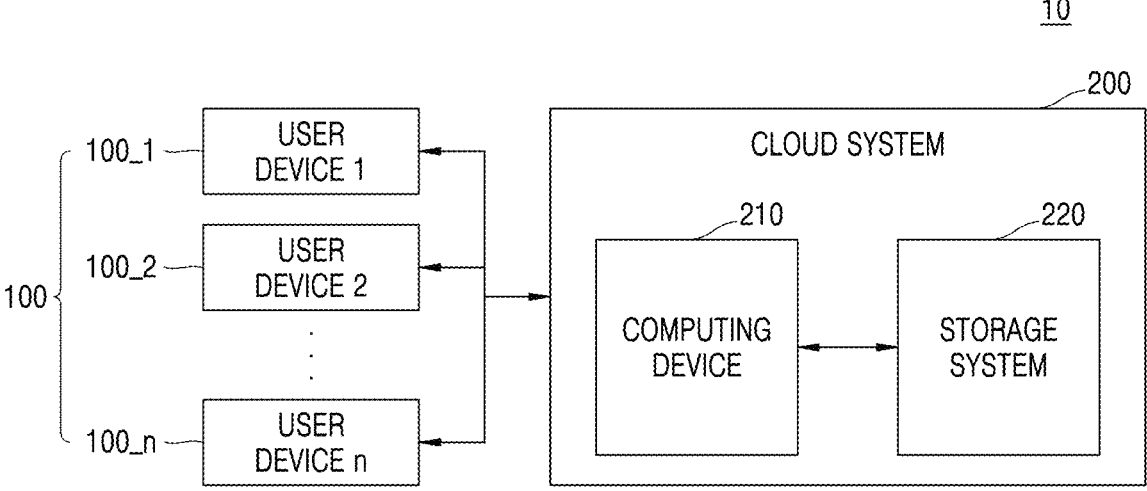
FIG. 1 is a block diagram showing a cloud system and surrounding components, according to some example embodiments.

The present inventive concepts will be described more fully hereinafter with reference to the accompanying drawings, in which some example embodiments are shown. As those skilled in the art would realize, the described example embodiments may be modified in various different ways, all without departing from the spirit or scope of the present inventive concepts.

Accordingly, the drawings and descriptions are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram showing a cloud system and surrounding components according to some example embodiments.

Referring to FIG. 1, a system 10 may include a plurality of user devices 100 and a cloud system 200.

The plurality of user devices 100 are electronic devices used by a user and may perform various operations related to data. The plurality of user devices 100 may include first to n-th user devices 100_1 to 100_n (n is a natural number equal to or greater than 2), and the first to n-th user devices 100_1 to 100_n may be devices used by first to n-th users, respectively.

According to some example embodiments, the plurality of user devices 100 may each be, but are not limited to, any one of a smartphone, a tablet PC, a smart TV, a mobile phone, a personal digital assistant (PDA), a laptop computer, a media player, a micro server, a global positioning system (GPS) device, an e-book reader, a digital broadcasting terminal, a navigation device, a kiosk, an MP3 player, a digital camera, a home appliance, and other mobile or non-mobile computing devices. In some example embodiments, the plurality of user devices 100 may each be a wearable device like a watch, glasses, a hair band, and a ring having a data processing function. However, example embodiments are not limited thereto, and the plurality of user devices 100 may include all types of devices using a processor to operate based on an operating system (OS). For example, according to some example embodiments, at least a part of each of the plurality of user devices 100 may include or be implemented as respective processing circuitry such as hardware (e.g., logic circuits) or a combination of hardware and software (e.g., a computer-based electronic system like a processor) executing instruction codes or program routines (e.g., a software program). The instruction codes or the program routines may be stored in any storage device located inside or outside the computer-based electronic system.

The plurality of user devices 100 may store data in the cloud system 200 and retrieve data stored in the cloud system 200. The plurality of user devices 100 may transmit various requests to the cloud system 200, such as a user subscription request, a function setting change request, a data storage request, a data erase request, and a data read request.

In some example embodiments, the user subscription request may be a request to allocate space for a user or a user device (e.g., user device 100_1 to 100_n) to store data in the cloud system 200. In some example embodiments, the function setting change request may be a request to change settings related to various functions related to how a user or a user device (e.g., user device 100_1 to 100_n) stores data in the cloud system 200. The data storage request may be a request to store data in the cloud system 200. The data erase request may be a request to erase at least some of data stored in the cloud system 200. The data read request may be a request to transmit at least some of data stored in the cloud system 200.

The cloud system 200 may be a system that stores data used by the plurality of user devices 100. The cloud system 200 may store data upon request from the plurality of user devices 100 and read and transmit data upon request from the plurality of user devices 100.

In some example embodiments, the cloud system 200 may include a computing device 210 and a storage system 220.

The computing device 210 may communicate with the plurality of user devices 100. The computing device 210 may operate based on requests received from the plurality of user devices 100.

In some example embodiments, the computing device 210 may perform calculations for a plurality of users through a plurality of virtual machines, respectively. The plurality of virtual machines may process requests received from the plurality of user devices 100. The number of a plurality of virtual machines may be equal to the number of a plurality of user devices, and, in some example embodiments, e.g., as illustrated in FIG. 1, the number of the plurality of virtual machines may be n. Therefore, the plurality of virtual machines may process requests received from the plurality of user devices 100, respectively. For example, a first virtual machine from among the plurality of virtual machines may process a request received from a first user device 100_1.

According to some example embodiments, the computing device 210 may transmit a user registration request and a user activation request to the storage system 220 in response to a user subscription request regarding a new user received from any one of the plurality of user devices 100.

According to some example embodiments, the computing device 210 may transmit a function setup request to the storage system 220 in response to a function setting change request received from any one of the plurality of user devices 100.

The storage system 220 may store data for a plurality of users. The storage system 220 may operate based on requests received from the computing device 210. For example, the storage system 220 may store data for a plurality of users as data storage requests are received from the computing device 210.

According to some example embodiments, when the storage system 220 receives a user registration request regarding a new user, the storage system 220 may allocate a user storage space for the new user in a plurality of internal storage devices.

According to some example embodiments, when the storage system 220 receives a user activation request regarding a new user, the storage system 220 provides user identification information regarding the new user based on user credential information of the new user included in the user activation request, allocate a user area for the new user in an internal memory, store the user identification information regarding the new user in the user area for the new user, and switch the user area regarding the new user to a locked state.

According to some example embodiments, when the storage system 220 receives a function setting request including user credential information of a first user from among the plurality of users, the storage system 220 may switch a user area regarding the first user of a memory from a locked state to a read-only state, read user identification information regarding the first user from the user area regarding the first user, and perform setting of encryption function of a user storage space for the first user in a plurality of storage devices based on the user identification information regarding the first user.

Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM)

The structures and the operations of the computing device 210 and the storage system 220, according to some example embodiments, will be described in more detail with reference to FIG. 2 and below.

Figure 2:
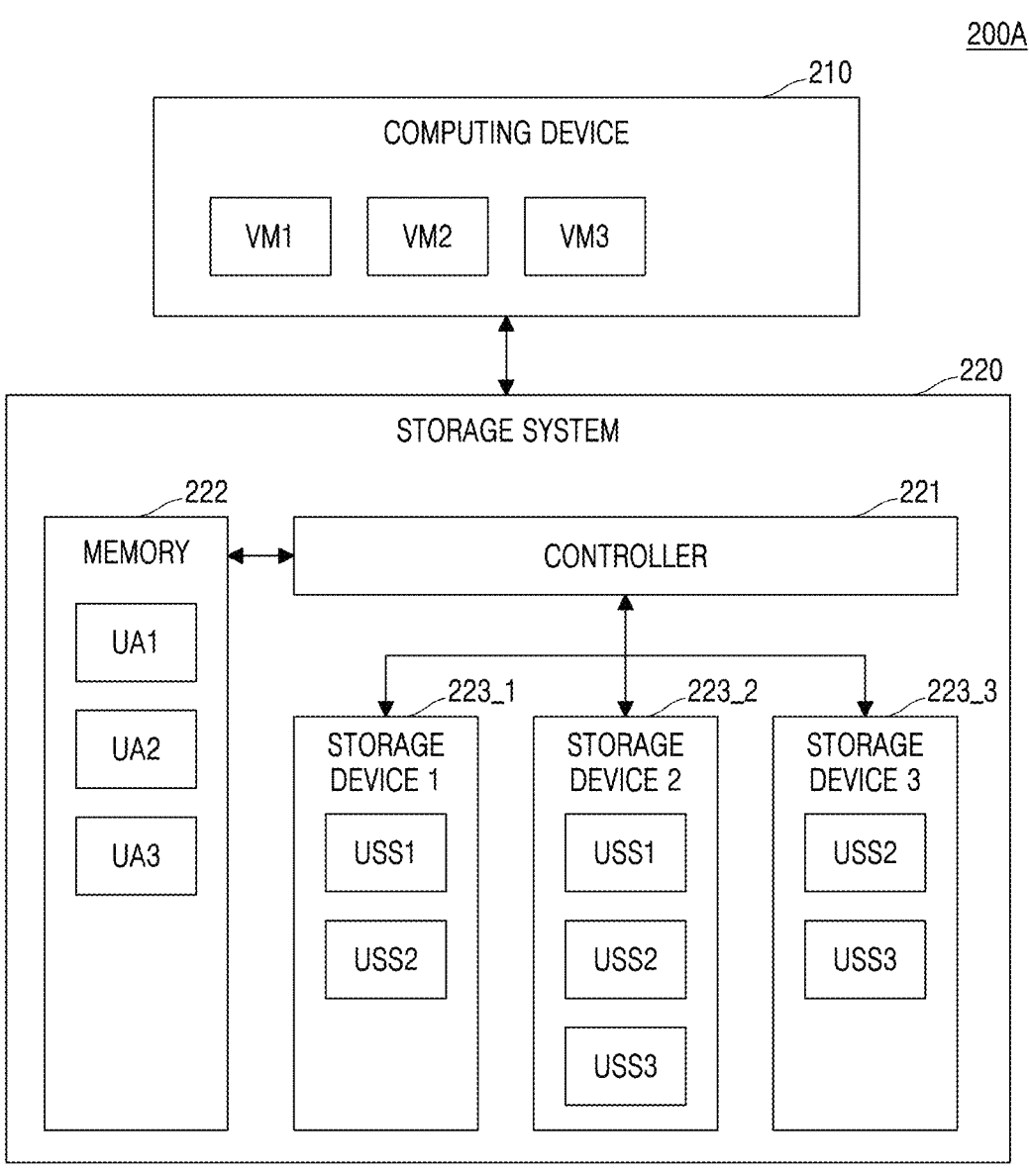
FIG. 2 is a block diagram showing a cloud system according to some example embodiments.

FIG. 2 is a block diagram showing a cloud system according to some example embodiments.

Referring to FIG. 2, a cloud system 200A may include the computing device 210 and the storage system 220.

The computing device 210 may include a plurality of virtual machines, for example, first to third virtual machines VM1 to VM3. For example, as illustrated in FIG. 2, the computing device 210 may include the first to third virtual machines VM1 to VM3. The first to third virtual machines VM1 to VM3 may perform calculations for first to third users, respectively. For example, a first virtual machine VM1 may perform a calculation for a first user based on a request received from the first user device 100_1. The computing device 210 may transmit requests to the storage system 220 in response to requests regarding the first to third users, through the first to third virtual machines VM1 to VM3.

The storage system 220 may store data for first to third users. The storage system 220 may be connected to the computing device 210 via a wire or wirelessly through a network, but example embodiments are not limited thereto.

The storage system 220 may include a controller 221, a memory 222, and a plurality of storage devices 223_1 to 223_3. In some example embodiments, at least a part of the controller 221 may include or be implemented as processing circuitry such as hardware (e.g., logic circuits) or a combination of hardware and software (e.g., a computer-based electronic system like a processor) executing instruction codes or program routines (e.g., a software program). The instruction codes or the program routines may be stored in any storage device located inside or outside the computer-based electronic system. Although FIG. 2 shows an example embodiment in which the plurality of storage devices 223_1 to 223_3 include a total of three storage devices, for example, first to third storage devices 223_1 to 223_3, example embodiments are not limited thereto, and the plurality of storage devices may include two storage devices or four or more storage devices.

The controller 221 may control the overall operation of the storage system 220. The controller 221 may operate based on requests received from the computing device 210, manage regions inside the memory 222, and manage storage spaces within the plurality of storage devices 223_1 to 223_3.

According to some example embodiments, the controller 221 may generate user identification information regarding a plurality of users based on user credential information of the plurality of users, respectively.

In some example embodiments, user credential information may be information related to a user input by the user through a user device and may include, for example, an ID, a password, etc., wherein the password may be in a hashed form. User credential information may be used to distinguish by which user a request received by the controller 221 is made.

User identification information is unique identification information set for each of a plurality of users and may be, for example, a personal identification number (PIN). User identification information may be used to obtain access approval to the plurality of storage devices 223_1 to 223_3 when the controller 221 accesses a plurality of storage devices 223_1 to 223_3 to perform a initial encryption function setup, encryption function setup, etc. When a new user wishes to use the storage system 220, the controller 221 may generate user identification information based on user credential information.

According to some example embodiments, the controller 221 may allocate user areas UA1 to UA3 to the memory 222 for a plurality of users, respectively. The plurality of user areas UA1 to UA3 may store user identification information for the plurality of users, respectively. When a new user wishes to use the storage system 220, the controller 221 may allocate the plurality of user areas UA1 to UA3 in the memory 222.

According to some example embodiments, the controller 221 may allocate user storage spaces USS1 to USS3 for the plurality of users in the plurality of storage devices 223_1 to 223_3, respectively. The plurality of user storage spaces USS1 to USS3 may store data used by the plurality of users, respectively. When a new user wishes to use the storage system 220, the controller 221 may allocate the plurality of user storage spaces USS1 to USS3 in the plurality of storage devices 223_1 to 223_3, respectively.

In some example embodiments, the memory 222 may store data used by the controller 221. In some example embodiments, the memory 222 may include a global area that stores data needed for the overall operation of the storage system 220.

According to some example embodiments, the memory 222 may include the plurality of user areas UA1 to UA3 respectively allocated to the plurality of users. The plurality of user areas UA1 to UA3 may be configured to store user identification information regarding the plurality of users, respectively.

In the example embodiment illustrated in, for example, FIG. 2, the computing device 210 includes the first to third virtual machines VM1 to VM3 that respectively perform operations for the first to third users, and thus the memory 222 may include first to third user areas UA1 to UA3. At this time, in some example embodiments, a first user area UA1 may store user identification information regarding a first user, a second user area UA2 may store user identification information regarding a second user, and a third user area UA3 may store user identification information regarding a third user.

The plurality of storage devices 223_1 to 223_3 may store data used by the plurality of users, respectively. According to some example embodiments, the plurality of storage devices 223_1 to 223_3 may each be any one of various types of storage devices, such as a solid state drive (SSD), an embedded universal flash storage (UFS) memory device, or an embedded multi-media card (eMMC). The plurality of storage devices 223_1 to 223_3 may each perform an encryption function (e.g., a self-encrypting drive (SED) function), and thus data stored in the plurality of storage devices 223_1 to 223_3 may be encrypted and stored.

According to some example embodiments, the plurality of storage devices 223_1 to 223_3 may include the user storage spaces USS1 to USS3 respectively allocated for the plurality of users. The plurality of user storage spaces USS1 to USS3 may store data used by the plurality of users, respectively.

In the example embodiment illustrated in, for example, FIG. 2, the computing device 210 includes the first to third virtual machines VM1 to VM3 that respectively perform operations for the first to third users, and thus the plurality of storage devices 223_1 to 223_3 may include first to third user storage spaces USS1 to USS3. For example, a first user storage space USS1 may be allocated in a first storage device 223_1 and a second storage device 223_2, a second user storage space USS2 may be allocated in the first storage device 223_1, the second storage device 223_2, and a third storage device 223_3, and a third user storage space USS3 may be allocated in the second storage device 223_2 and the third storage device 223_3. In this way, any one user storage space may not be allocated in one storage device, and any one user storage space may not be allocated in all of storage devices.

Figure 3:
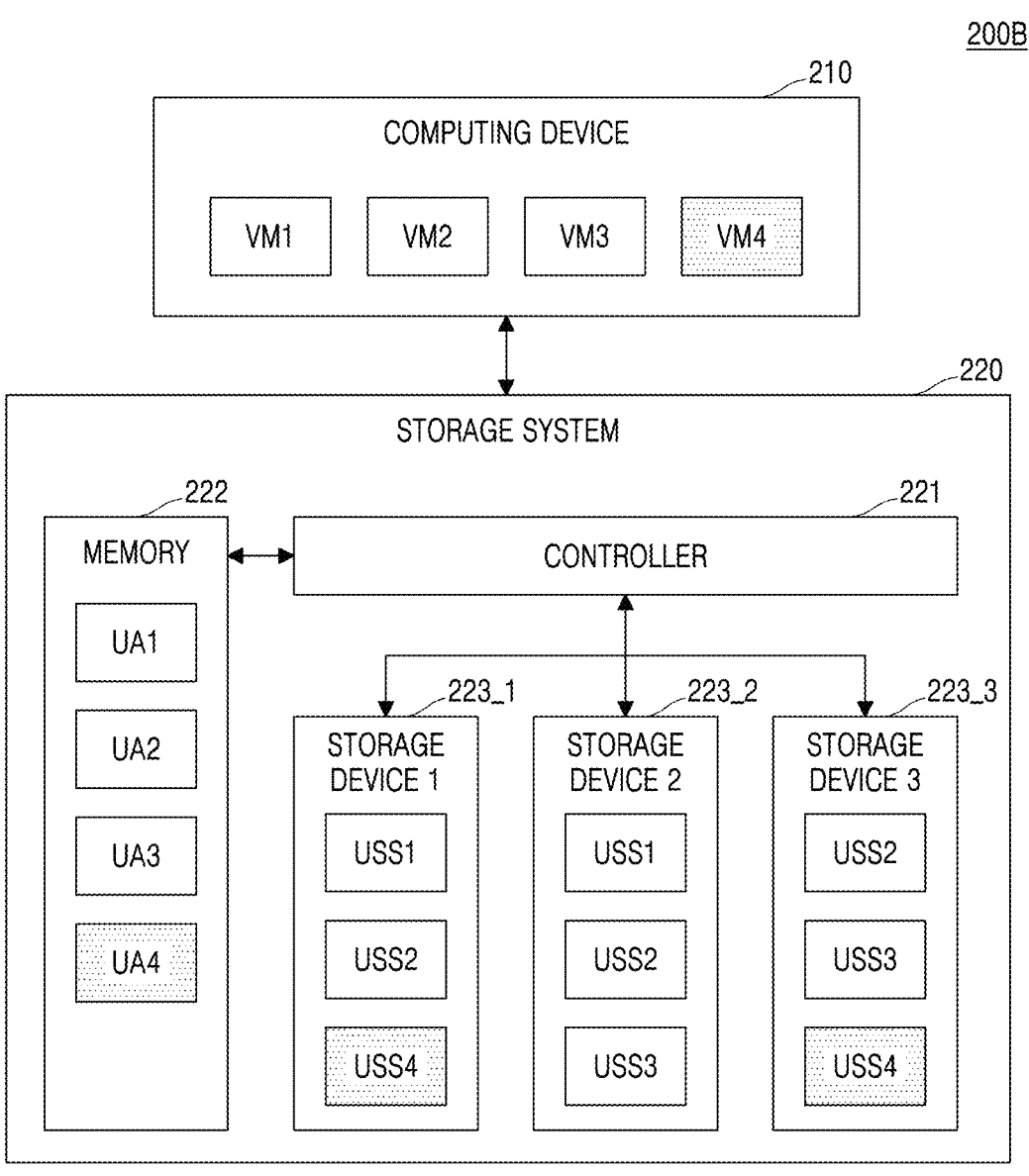
FIG. 3 is a block diagram showing a change in internal configuration of a cloud system when a new user subscribes to the cloud system according to some example embodiments.

FIG. 3 is a block diagram showing a change in internal configuration of a cloud system when a new user subscribes to the cloud system according to some example embodiments.

FIG. 3 shows a change in the configuration of a cloud system 200B corresponding to an example embodiment where a new user subscribes to the cloud system 200A as illustrated in the example embodiment of FIG. 2.

The computing device 210 may receive a user subscription request for a fourth user, who is a new user, from a fourth user device. The computing device 210 may internally generate a fourth virtual machine VM4 in response to the user subscription request for the fourth user. The computing device 210 may perform a calculation for the fourth user through the fourth virtual machine VM4.

The fourth virtual machine VM4 may generate a user registration request for the fourth user. The user registration request may be a request to allocate a user storage space for the corresponding fourth user in the storage system 220.

In some example embodiments, the fourth virtual machine VM4 may generate a user activation request for the fourth user. For example, user activation request may be a request to generate user identification information regarding a user in the storage system 220 and allocate a user area.

According to some example embodiments, user registration requests and user activation requests may include user credential information to distinguish users.

When the controller 221 receives a user registration request for the fourth user, which is a new user, the controller 221 may allocate a fourth user storage space USS4, which is a user storage space for the fourth user, in the plurality of storage devices 223_1 to 223_3. In some example embodiments, for example, as illustrated in FIG. 3, the controller 221 may allocate the fourth user storage space USS4 in the first storage device 223_1 and the third storage device 223_3.

When the controller 221 receives a user activation request for the fourth user, which is a new user, the controller 221 may generate user identification information based on user credential information of the fourth user. In some example embodiments, the controller 221 may allocate a fourth user area UA4, which is a user area for the fourth user, in memory 222.

After allocating the fourth user area UA4, the controller 221 may set the fourth user area UA4 to a writable state. For example, the writable state may refer a state in which both writing and reading of data may be freely performed in the corresponding area. The controller 221 may set the fourth user area UA4 to the writable state to store the user identification information regarding the fourth user in the fourth user area UA4.

After allocating the fourth user area UA4, the controller 221 may store the user identification information regarding the fourth user in the fourth user area UA4. After the controller 221 stores the user identification information regarding the fourth user in the fourth user area UA4 of the memory 222, the controller 221 may switch the fourth user area UA4 to a read-only state. For example, the read-only state may refer to a state that data may not be written to the corresponding area and only allows reading of the data. To prevent or mitigate the user identification information regarding the fourth user stored therein from being arbitrarily changed, the controller 221 may switch the fourth user area UA4 to the read-only state after the user identification information regarding the fourth user is stored in the fourth user area UA4.

According to some example embodiments, the controller 221 may perform initial setup of an encryption function for the fourth user storage space USS4 of the plurality of storage devices 223_1 to 223_3 by using the user identification information regarding the fourth user. For example, initial setup of the encryption function may be an operation to initially set matters such as whether to perform encryption on data of the fourth user in the plurality of storage devices 223_1 to 223_3. In some example embodiments, since the fourth user area UA4 is in the read-only state, the controller 221 may read the user identification information regarding the fourth user from the fourth user area UA4 and perform initial setup of the encryption function for the fourth user storage space USS4.

After the initial setup of the encryption function for the fourth user storage space USS4 is completed, the controller 221 may switch the fourth user area UA4 of the memory 222 to a locked state. For example, the locked state may refer to a state where data may neither be written to nor read from the corresponding user area. The controller 221 may switch the fourth user area UA4 to the locked state after the initial setup of the encryption function for the fourth user storage space USS4 is completed, to prevent or mitigate the user identification information regarding the fourth user from being arbitrarily read and prevent or mitigate the setting of the encryption function for the fourth user storage space USS4 from being arbitrarily changed.

When the cloud system 200B according to some example embodiments of the inventive concepts as described above is used, when the computing device 210 transmits a user registration request and a user activation request to the storage system 220 in response to a user subscription request of a new user, the computing device 210 transmits user credential information instead of user identification information used for the initial setup of encryption function and setting change of the encryption function in the storage system 220 to prevent, mitigate, or reduce the risk of possible hacking during the transmission process, thereby improving the security of the encryption function of the storage system 220.

FIG. 4 is a diagram showing a change in the state of a user area according to the operation of a storage system after a user activation request is received, according to some example embodiments.

FIG. 4 shows a table showing changes in the state of the fourth user area UA4 generated after a user activation request for the fourth user is received, as in the example embodiment of FIG. 3.

At this time, since no request for first to third users has been received, the state of the first to third user areas UA1 to UA3 may remain in a locked state LK.

First, as shown in the left table of FIG. 4, after the fourth user area UA4 is generated, the state of the fourth user area UA4 may be set to a writable state RW to store the user identification information regarding the fourth user.

Then, as shown in the center table of FIG. 4, after the user identification information regarding the fourth user is stored in the fourth user area UA4, the state of the fourth user area UA4 may be switched to a read-only state RO. Therefore, it is possible to prevent or mitigate the user identification information regarding the fourth user stored in the fourth user area UA4 from being arbitrarily changed.

Finally, as shown in the right table of FIG. 4, after the initial setup of the encryption function for the fourth user storage space USS4 is completed, the state of the fourth user area UA4 may be switched to the locked state LK.

When the cloud system 200B according to the inventive concepts as described above is used, after the initial setup of the encryption function is completed, a user area is switched to the locked state LK, thereby preventing, reducing, or mitigating the risk of hacking using user identification information inside the storage system 220. As a result, the security of the encryption function of the storage system 220 may be improved.

FIG. 5 is a diagram showing a change in the state of a user area when a storage system receives a function setup request, according to some example embodiments.

FIG. 5 shows a table showing a change in the state of the first user area UA1 when the storage system 220 as in the example embodiment of FIG. 3 receives a function setup request for the first user storage space USS1.

The function setup request is a request transmitted from the computing device 210 to the storage system 220 when a function setting change request requesting a change in the setting of the encryption function for the storage system 220 is received from the user device 100. In some example embodiments, a function setup request may include user credential information.

Before a function setup request is received, as shown in the left table of FIG. 5, the state of first to fourth user areas UA1 to UA4 may be in the locked state LK.

When the controller 221 receives a function setup request including user credential information of a first user, the controller 221 may switch the first user area UA1 of the memory 222 from the locked state LK to the read-only state RO. Accordingly, as shown in the center table of FIG. 5, after a function setup request including the user credential information of the first user is received, the state of the first user area UA1 may be switched to the read-only state RO to read user identification information regarding the first user needed for setting up the encryption function for the first user storage space USS1.

The controller 221 may read the user identification information regarding the first user from the first user area UA1 after the first user area UA1 is switched from the locked state LK to the read-only state RO. Then, the controller 221 may set up the encryption function for the first user storage space USS1 of the plurality of storage devices 223_1 to 223_3 based on the user identification information regarding the first user. The setup of the encryption function may be an operation to change settings such as whether to perform encryption.

When the controller 221 completes setting up the encryption function for the first user storage space USS1, the controller 221 may switch the first user area UA1 of the memory 222 from the read-only state RO to the locked state LK. Therefore, as shown in the right table of FIG. 5, after the setup of the encryption function for the first user storage space USS1 is completed, the state of the first user area UA1 may be switched to the locked state LK.

When the cloud system 200B according to the inventive concepts as described above is used, a user area is switched from the locked state LK to the read-only state RO only when the setup of the encryption function is performed, thereby preventing, reducing, or mitigating the risk of hacking using user identification information inside the storage system 220. As a result, the security of the encryption function of the storage system 220 may be improved.

FIG. 6 is a flowchart showing a method of operating a storage system when a new user subscribes the storage system, according to some example embodiments.

Referring to FIG. 6, in operation S610, the storage system 220 may receive a user registration request for a new user from the computing device 210. A user registration request for a new user may be a request to allocate a user storage space for the new user in a plurality of storage devices 223_1 to 223_3 in the storage system 220.

In operation S620, the storage system 220 may allocate a user storage space for the new user in the plurality of storage devices 223_1 to 223_3 in response to reception of the user registration request for the new user. At this time, the storage system 220 may allocate all of user storage spaces for the new user in one of the plurality of storage devices 223_1 to 223_3 or may divide a user storage space for the new user and allocate divided user storage spaces in two or more of the plurality of storage devices 223_1 to 223_3. The user registration request for the new user may include user credential information of the new user.

In operation S630, the storage system 220 may receive a user activation request for the new user from the computing device 210. A user activation request for a new user may be a request to generate user identification information regarding the new user and allocate a user area for the new user in the memory 222 of the storage system 220. The user activation request for the new user may include user credential information of the new user.

In operation S640, the storage system 220 may generate user identification information regarding the new user based on the user credential information of the new user in response to reception of the user activation request for the new user.

In operation S650, the storage system 220 may allocate a user area for the new user in the memory 222 in response to reception of a user activation request for the new user.

In operation S660, the storage system 220 may set the user area for the new user in the memory 222 to a writable state. The storage system 220 may set the user area for the new user to the writable state to store the user identification information regarding the new user in the user area for the new user.

In operation S670, the storage system 220 may store the user identification information in the user area for the new user in the memory 222.

In operation S680, the storage system 220 may set the user area for the new user in the memory 222 to a read-only state. To prevent or mitigate the user identification information regarding the new user from being arbitrarily changed, in operation S670, the storage system 220 may set the user area for the new user to the read-only state after the user identification information is stored in the user area for the new user.

In operation S690, the storage system 220 may perform initial setup of the encryption function for the user storage space for the new user in the plurality of storage devices 223_1 to 223_3. The storage system 220 may read the user identification information regarding the new user from the user area for the new user in the read-only state and use the read user identification information regarding the new user to perform the initial setup of the initial encryption function for the user storage space for the new user.

In operation S700, the storage system 220 may set the user area for the new user in the memory 222 to a locked state. To prevent, reduce, or mitigate the encryption function settings for the user storage space for the new user from being arbitrarily changed, the storage system 220 may set the user area for the new user to the locked state after the initial setup of the encryption function for the user storage space for the new user is completed in operation S690.

By using the cloud system 200 according to the inventive concepts as described above, the security of the encryption function of the storage system 220 may be improved.

Figure 7:
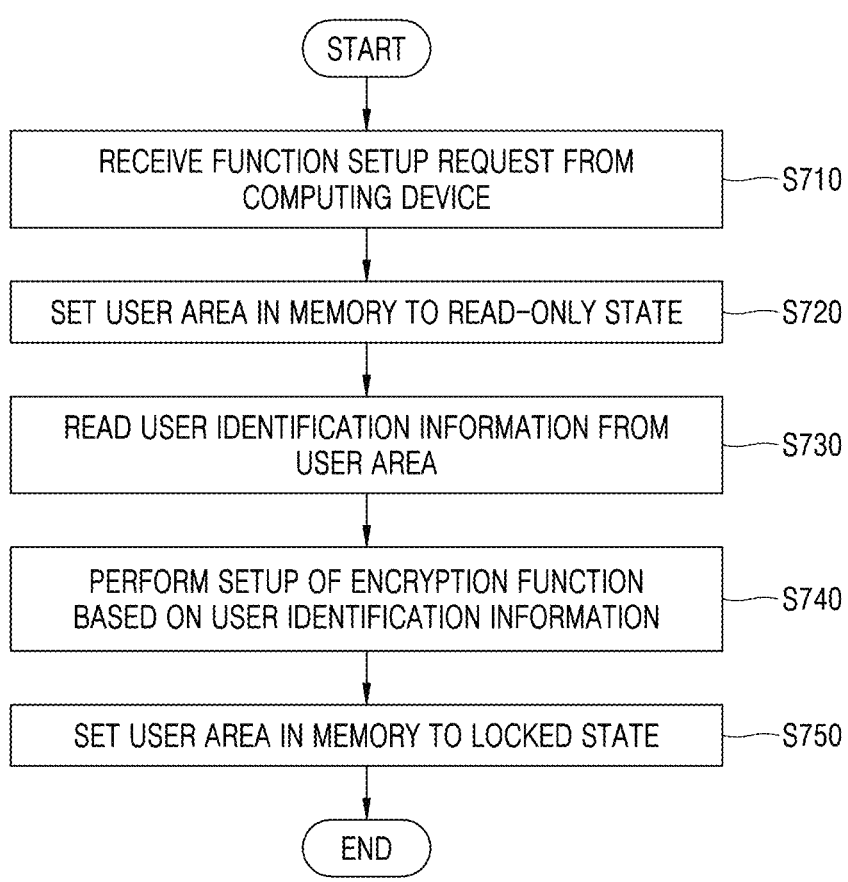
FIG. 7 is a flowchart of an operating method of a storage system when it is advantageous to change the function settings of the storage system, according to some example embodiments.

FIG. 7 is a flowchart of a method of operating a storage system when it is necessary or desirable to change the function settings of a storage system, according to some example embodiments.

Referring to FIG. 7, in operation S710, the storage system 220 may receive a function setup request from the computing device 210. The function setup request may include user credential information, and the storage system 220 may determine a user corresponding to the function setup request based on the user credential information. For example, when the function setup request includes user credential information of a first user, the storage system 220 may determine that the function setup request is sent by the first user.

In operation S720, the storage system 220 may set the user area for the user corresponding to the function setup request in the memory 222 to a read-only state in response to reception of the function setup request. For example, when the function setup request includes user credential information of a first user, the storage system 220 may set only the first user area UA1 to the read-only state.

In operation S730, the storage system 220 may read user identification information from the user area switched to the read-only state. The storage system 220 may read user identification information from the user area of the user corresponding to the function setup request. For example, when the function setup request includes user credential information of a first user, the storage system 220 may read user identification information regarding the first user from the first user area UA1.

In operation S740, the storage system 220 may perform setup of the encryption function for a user storage space of the user corresponding to the function setup request based on the user identification information. For example, when the function setup request includes the user credential information of the first user, the storage system 220 may perform setup of the encryption function for the first user storage space USS1 based on the user identification information regarding the first user.

In operation S750, when the setup of the encryption function is completed, the storage system 220 may set the user area switched to the read-only state to the locked state. For example, when the function setup request includes the user credential information of the first user, after the setup of the encryption function for the first user storage space USS1 is completed, the first user area UA1 may be set to the locked state.

Figure 8:
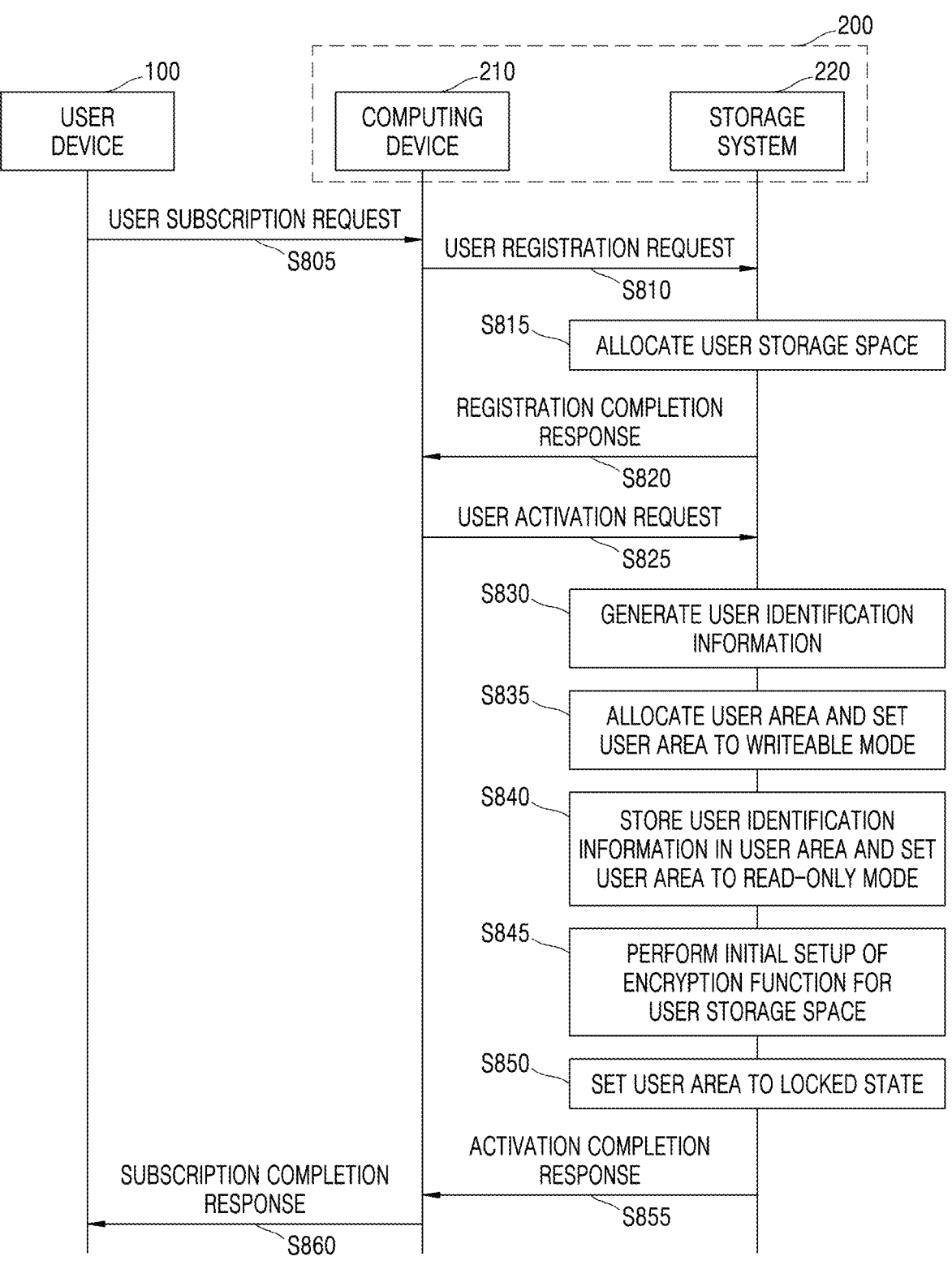
FIG. 8 is a flowchart of an operating method when a new user subscribes to a cloud system through a user device, according to some example embodiments.

FIG. 8 is a flowchart of a method of operating a system when a new user subscribes a cloud system through a user device, according to some example embodiments.

Referring to FIG. 8, in operation S805, a user device 100 may transmit a user subscription request for a new user to the computing device 210 of the cloud system 200.

In operation S810, when the user subscription request for the new user is received, the computing device 210 may transmit a user registration request for the new user to the storage system 220.

In operation S815, when the storage system 220 receives the user registration request for a new user, the storage system 220 may allocate a user storage space for the new user in the plurality of storage devices 223_1 to 223_3 therein.

In operation S820, when allocation of the user storage space for the new user is completed, the storage system 220 may transmit a registration completion response to the computing device 210.

In operation S825, when the registration completion response is received, the computing device 210 may transmit a user activation request for the new user to the storage system 220.

In operation S830, when the storage system 220 receives a user activation request for the new user, the storage system 220 may generate user identification information regarding the new user.

In operation S835, the storage system 220 may allocate a user area for the new user in the memory 222 therein and set the allocated user area for the new user to a writable mode.

In operation S840, the storage system 220 may store user identification information regarding the new user in the user area for the new user allocated in the memory 222 and set the user area for the new user to a read-only mode.

In operation S845, the storage system 220 may perform initial setup of the encryption function for the user storage space for the new user allocated in the plurality of storage devices 223_1 to 223_3.

In operation S850, when the setup of the encryption function is completed, the storage system 220 may set the user area for the new user allocated in the memory 222 to a locked state.

In operation S855, as the initial setup of the encryption function for the user storage space for the new user is completed and the user area for the new user is set to the locked state, the storage system 220 may transmit an activation completion response to the computing device 210.

In operation S860, when the activation completion response is received, the computing device 210 may transmit a subscription completion response indicating completion of all operations according to the user subscription request to the user device 100.

Figure 9:
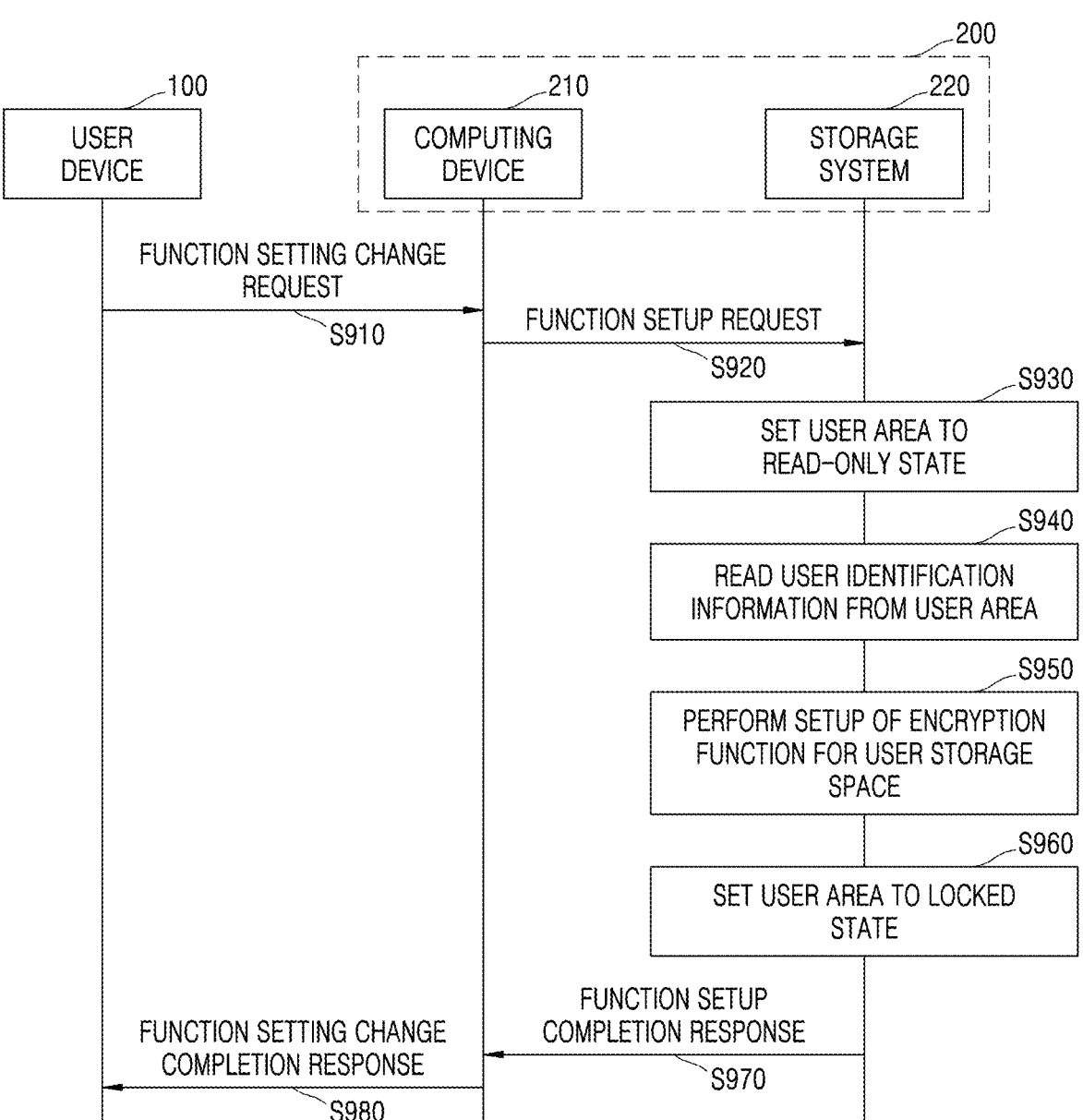
FIG. 9 is a flowchart of an operating method when a function setting change is performed on a cloud system through a user device, according to some example embodiments.

FIG. 9 is a flowchart of a method of operating a system when a function setting change is performed on a cloud system through a user device, according to some example embodiments.

Referring to FIG. 9, in operation S910, the user device 100 may transmit a function setting change request of a particular user to the computing device 210 of the cloud system 200.

In operation S920, when the computing device 210 receives a function setting change request from a particular user, the computing device 210 may transmit a function setup request of the particular user to the storage system 220. At this time, the computing device 210 may include user credential information in the function setup request, such that the storage system 220 may identify the particular user.

In operation S930, when the function setup request is received, the storage system 220 may set the user area for the particular user to a read-only state.

In operation S940, the storage system 220 may read user identification information from the user area for the particular user.

In operation S950, the storage system 220 may perform setup of the encryption function for a user storage space for the particular user based on the user identification information regarding the particular user.

In operation S960, when the setup of the encryption function for the user storage space for the particular user is completed, the storage system 220 may set the user area for the particular user to a locked state.

In operation S970, as the setup of the encryption function for the user storage space for the particular user is completed and the user area for the particular user is set to the locked state, the storage system 220 may transmit a function setup completion response to the computing device 210.

In operation S980, when the function setup completion response is received, the computing device 210 may transmit a setting change completion response indicating completion of all operations according to the function setting change request to the user device 100.

FIG. 10 is a flowchart of another example of a method of operating a storage system when a new user subscribes the storage system, according to some example embodiments.

Referring to FIG. 10, in operation S1010, the storage system 220 may receive a user setup request for a new user from the computing device 210. The user setup request for a new user is a combined request of a user registration request and a user activation request, and, as the storage system 220 receives the user setup request, all of operations performed upon reception of a user registration request and a user activation request in the embodiment of FIG. 6 may be performed. At this time, the user setup request may include user credential information.

In operation S1020, the storage system 220 may generate user identification information regarding the new user based on the user credential information of the new user in response to reception of the user setup request for the new user. Operation S1020 may be performed in the same way as operation S640.

In operation S1030, the storage system 220 may allocate a user area for the new user in the memory 222 in response to reception of the user setup request for the new user. Operation S1030 may be performed in the same way as operation S650.

In operation S1040, the storage system 220 may set the user area for the new user in the memory 222 to a writable state. Operation S1040 may be performed in the same way as operation S660.

In operation S1050, the storage system 220 may store the user identification information in the user area for the new user in the memory 222. Operation S1050 may be performed in the same way as operation S670.

In operation S1060, the storage system 220 may set the user area for the new user in the memory 222 to a read-only state. Operation S1060 may be performed in the same way as operation S680.

In operation S1070, the storage system 220 may allocate a user storage space for the new user in the plurality of storage devices 223_1 to 223_3 in response to reception of the user setup request for the new user. Operation S1070 may be performed in the same way as operation S620.

Here, operations S1020 to S1060 for allocating a user area in the memory 222 in the storage system 220 and storing user identification information may be performed in parallel with operation S1070 for allocating a user storage space in the plurality of storage devices 223_1 to 223_3 in the storage system 220. Therefore, the overall operation time of the storage system 220 according to the user setup request may be reduced.

In operation S1080, the storage system 220 may perform initial setup of the encryption function for the user storage space for the new user in the plurality of storage devices 223_1 to 223_3. Operation S1080 may be performed in the same way as operation S690.

In operation S1090, the storage system 220 may set the user area for the new user in the memory 222 to a locked state. Operation S1090 may be performed in the same way as operation S700.

While the inventive concepts have been shown and described with reference to some example embodiments thereof, it will be understood that various changes in form and details may be made therein without departing from the spirit and scope of the following claims.

What is claimed is:

1. A storage system, comprising:
a controller configured to control an overall operation of the storage system;
a memory including a plurality of user areas respectively allocated to a plurality of users and configured to store user identification information regarding the plurality of users in the plurality of user areas, respectively; and
a plurality of storage devices including a plurality of user storage spaces allocated for the plurality of users,
wherein, based on a user registration request for a new user being received, the controller is configured to allocate a user storage space for the new user in the plurality of storage devices, and
wherein, based on a user activation request for the new user being received after the user registration request, the controller is configured to
generate user identification information regarding the new user, based on user credential information of the new user included in the user activation request,
allocate a user area for the new user in the memory, and store the user identification information regarding the new user in the user area for the new user.

2. The storage system of claim 1, wherein the controller is configured to set the user area for the new user to a writeable state after the user area for the new user is allocated in the memory.

3. The storage system of claim 2, wherein the controller is configured to switch the user area for the new user in the memory to a read-only state after the user identification information regarding the new user is stored in the user area for the new user in the memory.

4. The storage system of claim 3, wherein the controller is configured to perform an initial setup of an encryption function for the user storage space for the new user in the plurality of storage devices by using the user identification information for the new user.

5. The storage system of claim 4, wherein the controller is configured to switch the user area for the new user in the memory to a locked state after the initial setup of the encryption function for the user storage space for the new user in the plurality of storage devices is completed.

6. The storage system of claim 1, wherein, when a function setup request comprising user credential information of a first user from among the plurality of users is received, the controller is configured to switch a user area for the first user in the memory from a locked state to a read-only state.

7. The storage system of claim 6, wherein the controller is configured to read user identification information regarding the first user from the user area for the first user in the memory, and perform setup of an encryption function for the user storage space for the first user in the plurality of storage devices, based on the user identification information regarding the first user.

8. The storage system of claim 7, wherein the controller is configured to switch the user area for the first user in the memory to the locked state when the setup of the encryption function is completed.

9. A storage system, comprising:

a controller configured to control an overall operation of the storage system;

a memory including a plurality of user areas respectively allocated to a plurality of users and configured to store user identification information regarding the plurality of users in the plurality of user areas, respectively; and a plurality of storage devices including a plurality of user storage spaces allocated for the plurality of users, wherein, when a function setup request comprising user credential information of a first user from among the plurality of users is received, the controller is configured to switch a user area for the first user in the memory from a locked state to a read-only state, read user identification information regarding the first user from the user area for the first user in the memory, and perform setup of an encryption function for the user storage space for the first user in the plurality of storage devices, based on the user identification information regarding the first user.

10. The storage system of claim 9, wherein the controller is configured to switch the user area for the first user in the memory to the locked state when the setup of the encryption function is completed.

11. The storage system of claim 9, wherein, when a user registration request for a new user is received, the controller is configured to allocate a user storage space for the new user in the plurality of storage devices.

12. The storage system of claim 11, wherein, when a user activation request for the new user is received, the controller is configured to generate user identification information regarding the new user, based on user credential information of the new user included in the user activation request, allocate a user area for the new user in the memory, and store the user identification information regarding the new user in the user area for the new user.

13. A cloud system, comprising:

a computing device configured to perform calculations for a plurality of users through a plurality of virtual machines, respectively; and a storage system configured to store data of the plurality of users, wherein the storage system includes a controller configured to control an overall operation of the storage system;

a memory including a plurality of user areas respectively allocated to the plurality of users and configured to store user identification information regarding the plurality of users in the plurality of user areas, respectively; and a plurality of storage devices including a plurality of user storage spaces allocated for the plurality of users, and the computing device is configured to transmit a user setup request for a new user to the controller, the user setup request including a user registration request and a user activation request, and in response to the user setup request, the controller is configured to allocate a user area for the new user in the memory based on the user registration request, generate user identification information regarding the new user, based on user credential information of the new user included in the user registration request, store the user identification information regarding the new user in the user area for the new user, and allocate a user storage space of the new user in the plurality of storage devices based on the user registration request.

14. The cloud system of claim 13, wherein the controller is configured to set the user area for the new user to a writeable state after the user area for the new user is allocated in the memory.

15. The cloud system of claim 14, wherein the controller is configured to switch the user area for the new user in the memory to a read-only state after the user identification information regarding the new user is stored in the user area for the new user in the memory.

16. The cloud system of claim 13, wherein the controller is configured to perform initial setup of an encryption function for the user storage space for the new user in the plurality of storage devices by using the user identification information for the new user.

17. The cloud system of claim 16, wherein the controller is configured to switch the user area for the new user in the memory to a locked state after the initial setup of the encryption function for the user storage space for the new user in the plurality of storage devices is completed.

18. The cloud system of claim 13, wherein the computing device is configured to send a function setup request comprising user credential information of a first user from among the plurality of users to the controller, and when the function setup request is received, the controller is configured to switch the user area for the first user in the memory from a locked state to a read-only state.

19. The cloud system of claim 18, wherein the controller is configured to read user identification information regarding the first user from the user area for the first user in the memory, and perform setup of an encryption function for the user storage space for the first user in the plurality of storage devices, based on the user identification information regarding the first user.

20. The cloud system of claim 19, wherein the controller is configured to switch the user area for the first user in the memory to the locked state when the setup of the encryption function is completed.

* * * * *